United States Patent
Niechayev (12)

(10) Patent No.: US 6,809,681 B1
(45) Date of Patent: Oct. 26, 2004

(54) RANDOM-MODULATION RADAR SIGNAL-INDUCED INTERFERENCE CANCELLATION METHOD AND APPARATUS

(75) Inventor: Alexander Niechayev, Riverside, CA (US)

(73) Assignee: Raytheon Company, Waltham, MA (US)

( * ) Notice: Subject to any disclaimer, the term of this patent is extended or adjusted under 35 U.S.C. 154(b) by 1826 days.

(21) Appl. No.: 07/934,398

(22) Filed: Aug. 25, 1992

(51) Int. Cl.[7] .................. G01S 13/00; G01S 13/58
(52) U.S. Cl. .................. 342/159; 342/109; 342/189
(58) Field of Search ................ 342/109, 159, 342/189, 134, 196, 194, 195, 137

(56) References Cited

U.S. PATENT DOCUMENTS

| | | | |
|---|---|---|---|
| 3,668,702 A | 6/1972 | Jones | 343/5 R |
| 3,710,387 A | 1/1973 | Hinchman et al. | 343/12 R |
| 3,819,920 A | 6/1974 | Goldfischer | 235/152 |
| 3,938,145 A | 2/1976 | Brook et al. | 343/5 W |
| 4,044,356 A | 8/1977 | Fournier | 343/17.2 R |
| 4,339,754 A | 7/1982 | Hammers et al. | 343/7.7 |
| 4,462,032 A | 7/1984 | Martin | 343/5 CM |
| H205 H | 2/1987 | Green et al. | 342/134 |
| 4,661,816 A | 4/1987 | Musha et al. | 342/91 |
| 4,742,353 A | 5/1988 | D'Addio et al. | 342/159 |
| 4,891,649 A | 1/1990 | Labaar et al. | 342/203 |
| 4,931,800 A | 6/1990 | Ward | 342/162 |
| 4,959,656 A | 9/1990 | Kumar | 342/418 |
| 5,481,504 A * | 1/1996 | Rosenbach et al. | 367/101 |
| 5,617,099 A * | 4/1997 | Warren et al. | 342/159 |
| 6,392,588 B1 * | 5/2002 | Levanon | 342/202 |

FOREIGN PATENT DOCUMENTS

| | | | |
|---|---|---|---|
| SU | 0720388 | 3/1980 | G01S/9/42 |
| SU | 0809018 | 2/1981 | G01S/7/36 |

* cited by examiner

*Primary Examiner*—Thomas H. Tarcza
*Assistant Examiner*—Brian Andrea
(74) *Attorney, Agent, or Firm*—Thomas J. Finn; Leonard A. Alkov; Philip P. Berestecki

(57) ABSTRACT

An uncorrelated clutter noise cancellation method and apparatus employing a measured ambiguity function sample for each randomly-modulated transmission pulse in a randomly-modulated pulsed Doppler radar system. The ambiguity function samples are calculated from a stored copy of the randomly-modulated transmission signal. Estimates of the uncorrelated clutter backscatter are first developed by calculating the amplitude and phase of the radar returns detected in target range and velocity cells corresponding to stationary scatterers. The stationary scatterer contribution to each target cell, computed according to the sample ambiguity function, is then subtracted to eliminate the uncorrelated noise component in the return signal for the target cell. This clutter cancellation technique does not rely on correlations between the randomly-modulated transmission signal and the clutter return signal.

4 Claims, 12 Drawing Sheets

RANDOM REFERENCE SIGNAL

[EQN. 1]  $s_n(t) = m(t)p(t-nT)e^{-j(\omega_c t + \gamma)}$

DEMODULATED/SAMPLED REFERENCE SIGNAL

[EQN. 2]  $r_{nm}(\Delta) = \int_{mT_s + nT}^{(m+1)T_s + nT} s_n(t-\Delta) e^{j(\omega_c(t-\Delta) + \gamma)} dt$

[EQN. 3]  $r_{nm}(\Delta) = a_{nm}(\Delta) p(mT_s - \Delta) e^{j(\delta - \gamma)}$ Where,

[EQN. 4]  $a_{nm}(\Delta) = \int_0^{T_s} m(t + nT + mT_s - \Delta) dt$

FIG. 3A
PRIOR ART $m(t)$ = PSEUDO-RANDOM MODULATION FUNCTION
$p(t)$ = PULSE GATE FUNCTION
$T$ = PULSE REPETITION TIME
$\Delta$ = RANGE DELAY TIME
$T_s$ = SAMPLE WINDOW TIME
$\tilde{c}$ = CLUTTER SCATTERING FUNCTION

RECEIVED SIGNAL WITH CLUTTER

[EQN. 5]  $X(t) = \sum_{n=-\infty}^{\infty} X_n(t)$

[EQN. 6]  $X_n(t) = A \int_0^{\pi} \int_0^{2\pi} \int_0^{\infty} \frac{G(\theta,\phi)}{R(\tau)^2} s_n(t-\tau) \tilde{c}(\theta,\phi,\tau;t) R(\tau) d\tau \, d\theta \, d\phi$

DEMODULATED/SAMPLED RECEIVED SIGNAL

[EQN. 7]  $X_{nm} = \int_{mT_s + nT}^{(m+1)T_s + nT} X_n(t) e^{j(\omega_c t + \delta)} dt$

[EQN. 8]  $X_n(t) = A \int_0^{\pi} \int_0^{2\pi} \int_0^{\infty} \frac{G(\theta,\phi)}{R(\tau)} \tilde{c}(\theta,\phi,\tau-\frac{2V_c}{c}nT) e^{j\omega_c \tau} r_{nm}(\tau) d\tau \, d\theta \, d\phi$

CORRELATION OUTPUT SIGNAL

[EQN. 9]  $y_n(\Delta) = \sum_{m=1}^{M} r_{nm}^*(\Delta) \sum_{i=-\infty}^{\infty} X_{im}$

FIG. 3B
PRIOR ART

$\tilde{s}_c(\tau)$ = COMPLEX SCATTERING FUNCTION $W_n$ = WEIGHTS $\Delta$ = RANGE DELAY TIME $f_n$ = nth DOPPLER FREQUENCY $\tilde{\chi}(\tau, f_D)$ = COMPLEX MATCHED FILTER RESPONSE

DOPPLER FILTER BANK OUTPUT SIGNALS

[EQN. 10] $\quad z(\Delta, f_n) = \sum_{n=0}^{N-1} W_n \, y_n(\Delta) \, e^{-j2\pi n f_n}$

[EQN. 11] $\quad z(\Delta, f_n) = \int_0^\infty \tilde{s}_c(\tau) \tilde{\chi}\left(\Delta - \tau, \left(f_n - \frac{2V_c(\theta_A)}{\lambda}\right)T\right) d\tau$

[EQN. 12] $\quad z(\Delta, f_n) = \tilde{s}_c^*(\Delta) \, \tilde{\chi}\left(\Delta, \left(f_n - \frac{2V_c(\theta_A)}{\lambda}\right)T\right)$ Where,

[EQN. 13] $\quad \tilde{s}_c(\tau) = A \int_{-\theta_m}^{\theta_m} \frac{G(\theta)}{R(\tau)} \tilde{c}(\theta + \theta_A, \tau) e^{j\omega_c \tau} d\theta$

[EQN. 14] $\quad \tilde{\chi}(\tau, f_D) = \sum_{n=0}^{L-1} W_n \sum_m a_{nm}^*\left(\frac{2V_c}{c} nT\right) a_{nm}\left(\frac{2V_c}{c} nT - \tau\right) e^{-j2\pi n f_D T}$

SCATTERING NOISE MODEL

[EQN. 15] $\quad \tilde{s}_c(\tau) = \sum_{i=1}^{N_s} c_i \delta(\tau - \tau_{ci})$

FIG. 10

DOPPLER RESPONSE OF SCATTERING NOISE

[EQN. 16] $\quad Z(\Delta, f) = \sum_{i=1}^{N_s} c_i \chi(\Delta - \tau_{ci}, f - f_{ci})$

SCATTERING NOISE ESTIMATE

[EQN. 17] $\quad \hat{s}(\tau_{cj}) = \dfrac{Z(\tau_{cj}, f_{cj})}{\tilde{\chi}_R(0,0)} = \sum_{i=1}^{N_s} c_i \dfrac{\tilde{\chi}(\tau_{cj} - \tau_{ci}, 0)}{\tilde{\chi}_R(0,0)}$ ; $j = 1, \ldots N_s$

UNCORRELATED CLUTTER ESTIMATE IN TARGET CELL

[EQN. 18] $\quad \hat{Z}(\Delta_T, f_T) = \sum_{j=1}^{N_s} \hat{s}(\tau_{cj}) \tilde{\chi}_R(\tau_T - \tau_{cj}, f_T - f_{cj})$ Where, $\tilde{\chi}_R(\Delta, f)$ = STORED REFERENCE RESPONSE FUNCTION $N_s$ = NUMBER OF DISCRETE SCATTERERS

RESIDUAL CLUTTER POWER

$$\Delta P_c = E\{|z(\tau_T,f_T) - \hat{z}(\tau_T,f_T)|^2\}$$

FIG. 11

$$\Delta P_c = E\left\{\left|\sum_{i=1}^{N_s} c_i \tilde{\chi}(\tau_T-\tau_{ci},f_T-f_{ci}) - \sum_{j=1}^{N_s}\sum_{i=1}^{N_s} c_i \frac{\tilde{\chi}(\tau_{cj}-\tau_{ci},0)}{\tilde{\chi}_R(0,0)} \tilde{\chi}_R(\tau_T-\tau_{cj},f_T-f_{cj})\right|^2\right\}$$

$$\Delta P_c = \sum_{i=1}^{N_s} \sigma_{ci}^2 E\left\{\left|\sum_{j=1}^{N_s} \frac{\tilde{\chi}(\tau_{cj}-\tau_{ci},0)}{\tilde{\chi}_R(0,0)} \tilde{\chi}_R(\tau_T-\tau_{cj},f_T-f_{cj})\right|^2\right\}; \; j \neq i$$

$$\Delta P_c = \sigma_c^2 \sum_{i=1}^{N_s} \sum_{j=1}^{N_s} \underbrace{E\left\{\left|\frac{\tilde{\chi}(\tau_{cj}-\tau_{ci},\rho)}{\tilde{\chi}_R(0,0)}\right|^2\right\}}_{\frac{1}{MN}} \underbrace{E\{|\tilde{\chi}_R(\tau_T-\tau_{cj},f_T-f_{cj})|^2\}}_{\sigma_{SL}^2}; \; j \neq i$$

[EQN. 19]   $\Delta P_c = \dfrac{\sigma_c^2 N_s(N_s-1)}{MN} \sigma_{SL}^2$

PRE-CANCELLATION INPUT POWER

$$P_c = E\{|z(\tau_T,f_T)|^2\} = E\left\{\left|\sum_{i=1}^{N_s} c_i \tilde{\chi}(\tau_T-\tau_{ci},f_T-f_{ci})\right|^2\right\}$$

[EQN. 20]   $P_c = \sum_{i=1}^{N_s} \sigma_{ci}^2 E\{|\tilde{\chi}(\tau_T-\tau_{ci},f_T-f_{ci})|^2\} = \sigma_c^2 N_s \sigma_{SL}^2$

UNCORRELATED CLUTTER CANCELLATION IMPROVEMENT

[EQN. 21]   $\dfrac{\Delta P_c}{P_c} = \dfrac{N_s-1}{MN} \approx \dfrac{\text{MAINBEAM ILLUMINATION DWELL}}{\text{COHERENT PROCESSING GAIN}}$

RANDOM-MODULATION RADAR SIGNAL-INDUCED INTERFERENCE CANCELLATION METHOD AND APPARATUS

BACKGROUND OF THE INVENTION

1. Field of the Invention

The present invention relates generally to radar signal processing methods for enhancing target detection in clutter and, in particular, to an uncorrelated clutter return cancellation technique using sample ambiguity function measurements.

2. Discussion of the Related Art

Wideband randomly-modulated radar signal waveforms offer a number of advantages for many radar applications. A radar waveform having random modulation of a known bandwidth centered about a carrier frequency has application to conventional pulsed Doppler radar receiver structures such as pulse compressors in combination with cross-correlation circuits for correlating a reconstructed copy of the transmitted modulation with the radar return signal.

The radar ambiguity function is a mathematical concept that provides a measure of the "ambiguity" inherent in a radar modulation waveform with respect to the radar return signal time delay intervals (target range "cells") and Doppler frequency shifts (target velocity "cells") of interest. In the context of a specific target and interference environment that includes clutter interference, the "goodness criteria" of a radar modulation waveform are generally based on the radar system's capability to distinguish the differences superimposed by two or more targets on their respective reflected radar signal components. One such criterion is the "mean square departure" of the modulated waveform from its shifted self in time and frequency. This criterion can be expressed as a squared magnitude of the two-dimensional autocorrelation function that is well-known in the art as the radar ambiguity function.

The radar ambiguity function can be appreciated as a surface above the target range-velocity (time delay-Doppler shift) plane. The height of such a surface is a measure of the ambiguity (or interference) generated by the radar modulation waveform at a point displaced from a target's true position and true Doppler shift by an amount equal to the corresponding coordinates oh the target range-velocity plane. Conversely, the radar ambiguity function predicts the interference created at the range-velocity cell location of a desired signal by an undesired target located at a range and velocity offset equivalent to the corresponding coordinates on the target range-velocity plane.

The ambiguity function is commonly used by modulation waveform designers to describe the resolution and interference problems anticipated for a particular modulation waveform. The ideal ambiguity function is known in the art as the "thumbtack", which simultaneously provides both good Doppler and good range target resolution (see, e.g. FIG. 4A). The ambiguity function for a randomly-modulated waveform is a random function whose mean value represents the spike at the center of the "thumbtack" ambiguity surface known in the art. The mean squared value of the radar ambiguity function determines the degree to which distributed scattering surfaces (clutter) will cause interference in potential target range-velocity cells over the range-velocity plane. Refer to, for example, Barton et al., "Radar Evaluation Handbook", Artech House, Norwood, Mass., 1991, for additional teachings of the related art.

The randomly-modulated radar signal waveform has attractive features for radar operation in hostile environments but introduces new and unique clutter problems. Clutter analysis has shown that the baseline random modulation waveform is severely clutter limited. Such signal clutter can be described as two components. First, the correlated clutter component results from the radar return signal at the range corresponding to the reference range gate. Secondly, the signal-induced clutter component arises because of modulation that occurs at ranges other than the correlated range gate. This second component is uncorrelated with respect to the randomly-modulated radar reference signal used in the cross-correlation detection process.

The first correlated clutter component is similar to the clutter signal found in range-gated airborne radars using non-random modulation and has a clutter spectrum shaped by the antenna pattern and Doppler distribution. The second uncorrelated component exhibits a flat power spectral density and appears as an increase in total detection noise level. This noise level increase appears as a pedestal on the ambiguity surface (see, e.g. FIG. 4B) at an elevation corresponding to the variance of the random signal-induced clutter noise. Thus, clutter, which can include deception and jamming signals, at Doppler frequencies separated from the target Doppler can introduce an uncorrelated noise level in the target cell much larger than the correlated signal received from targets of interest.

This signal-induced uncorrelated clutter noise effect does not occur in conventional non-random modulation radar designs and is a direct result of the randomly-modulated signal reflections from scatterers at ranges other than the target range. The typical application of a randomly-modulated signal radar employs bandwidths of 500 MHz or more to obtain correspondingly refined range resolution. Thus, the uncorrelated clutter noise power is seen to be much greater than the power of the first correlated clutter component, which is equivalent to the clutter levels known for non-random modulated radar systems.

Most conventional radar clutter rejection methods rely on the correlated properties of the received clutter signals. Correlated clutter can be suppressed by conventional Doppler-processing techniques known in the art, which exploit the correlation (power spectral density function) of the received signal. Such techniques include moving target indicator (MTI), pre-whitening and/or bandpass filters. Such filters can be made adaptive to the shape of the received signal spectrum by including means for estimating characteristics of the clutter environment and dynamically adjusting the filter characteristics accordingly. However, correlated clutter suppression techniques known in the art are ineffective in reducing the uncorrelated clutter components arising from randomly-modulated signal-induced noise. Since the uncorrelated noise has a uniformly flat Doppler spectrum (equivalent to the variance of the random modulation function), known filters that exploit the correlation or shape of the frequency response spectrum cannot reduce the level of this random signal-induced noise term.

The matched filter receiver has been known in the art since the 1940's. All matched filter receivers correlate the received signal with a reference copy of the transmitted signal. For instance, in U.S. Pat. No. 4,891,649, Labaar et al. disclose a method for achieving a "coherent-on-receive" RF receiver by storing a reference copy of the transmitted signal for use in a correlation receiver. Similarly, in U.S. Pat. No. 4,882,668, Hans-Peter Schmid et al. disclose an adaptive matched filter for extracting known signals from intense noise fields using a form of correlation. Neither of these basic ideas address the problem of canceling uncorrelated clutter signal because such filtering is ineffective for the reasons discussed above.

In U.S. Pat. No. 4,742,353, D'Addio et al. disclose an adaptive filter approach to clutter cancellation. Their method estimates parameters for an assumed signal and clutter model that adjusts filter response characteristics to increase signal-to-noise ratio (SNR). The disclosed filter discriminates signals on the basis of Doppler frequency shift. Because signal-induced clutter has a uniformly flat power spectral density, Doppler filtering approaches such as this are ineffective for reducing such uncorrelated noise.

In U.S. Pat. No. 4,931,800, Ward discloses a compensation method for a moving target detector that removes the effects of pulse stagger during transmission. Other practitioners in the art have addressed problems related to clutter cancellation for non-random and random modulation radar systems but none have proposed a method for canceling the uncorrelated random signal-induced clutter components that are unique to randomly-modulated signal radars. Refer to U.S. Pat. Nos. 3,668,702, 3,710,387 and 3,938,145 for additional teachings representative of efforts in the art to improve clutter cancellation in pulsed Doppler radar systems.

There has not previously been any viable means for reducing the randomly-modulated signal-induced clutter components arising from clutter at ranges other than the correlated gate range, despite the very high levels of this noise in randomly-modulated signal radars. This unresolved problem is clearly felt in the art and is solved by this invention in the manner described below.

SUMMARY OF THE INVENTION

The present method for canceling the signal-induced clutter noise requires an estimate of the autocorrelation function of the transmitted randomly-modulated signal. The sample ambiguity function is measured for each transmission pulse by calculating the autocorrelation function for a stored copy of the transmitted randomly-modulated signal. This measured autocorrelation function is then processed using a Doppler processor (such as a Fast-Fourier-Transform (FFT) Processor) matched to the radar Doppler processor used in the radar receiver. The corresponding ambiguity function created by the Doppler processor is the exact power spectral density of the transmitted randomly-modulated signal over a selected region of the range-velocity plane.

The next step in this cancellation method is to estimate clutter backscatter sources by calculating the amplitude and phase of the radar signal returns occurring in detection cells that correspond to stationary scatterers. By looking for large signal peaks in the received signal Doppler filter bank, the system of this invention can identify the location of the stationary scatterers whose clutter contribution is to be canceled. The large signal peaks from the received signal Doppler filter bank are then combined with the measured modulation ambiguity function to obtain an estimate of the stationary clutter contribution to the noise in each target resolution cell.

Finally, the estimated clutter noise power in each cell is subtracted to produce a clutter-canceled power level in each. The clutter source signal and modulation spectral density (ambiguity function) can be combined according to a weighting algorithm based on the Maximum Likelihood Principle using a priori knowledge of antenna parameters if desired. Also, the combination can be made adaptive through the use of a suitable gradient search algorithm to minimize the residual noise level in the target cell. Both the Maximum Likelihood Principal and suitable examples of gradient search algorithms are known in the art.

Thus, this noise cancellation method employs a unique approach to weighting of the measured modulation matched filter response by the estimated scatterer reflectivity to form an estimate of noise interference arising from the modulation of reflecting surfaces by the randomly-modulated radar waveform. The foregoing, together with other features and advantages of this invention, will become more apparent when referring to the following specification, claims and the accompanying drawing.

BRIEF DESCRIPTION OF THE DRAWING

For a more complete understanding of the invention, reference is made to the following detailed description of the embodiments illustrated in the accompanying drawing, wherein:

FIGS. 3A and 3B present Eqns. 1–14 describing the mathematical relationships embodied in the receiver of FIG. 2;

FIG. 10 presents Eqns. 15–18 describing the mathematical relationships embodied in the interference canceler apparatus of FIG. 9;

FIG. 11 presents Eqns. 19–20 describing the theoretical residual power and associated signal-to-noise ratio improvement for the interference canceler apparatus of FIG. 9; and FIG. 12 shows the random signal-induced noise cancellation results expressed in terms of the reduction in ambiguity surface pedestal height over the noise floor as a function of the antenna beamwidth in degrees.

DETAILED DESCRIPTION OF THE PREFERRED EMBODIMENTS

Figure 1:
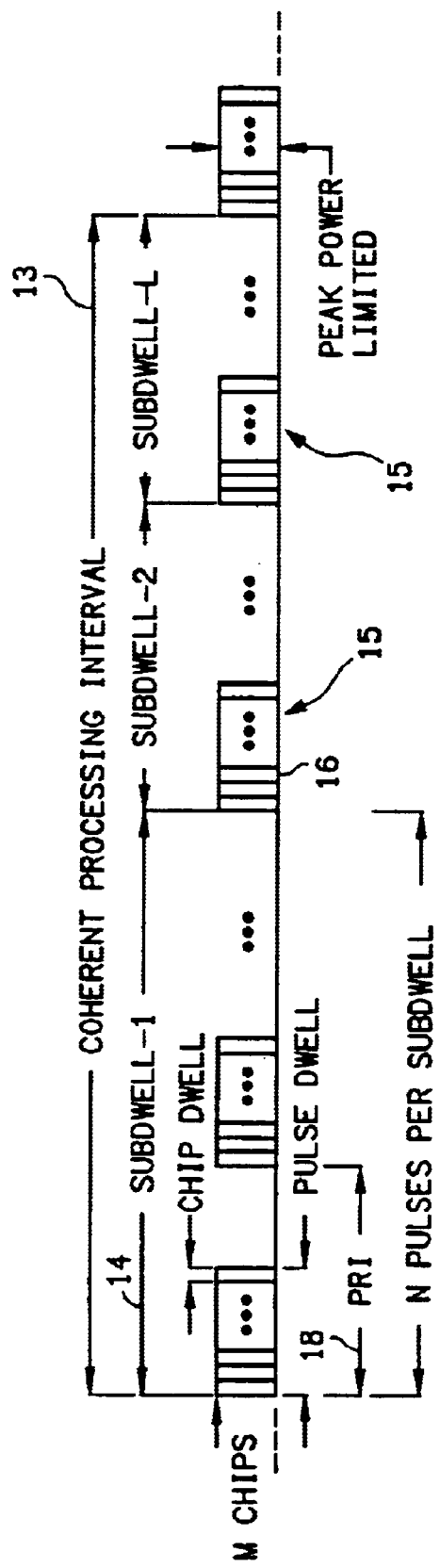
FIG. 1 shows an illustrative random signal waveform from the prior art.

Reference is made to the following Table 1 for a summary of the symbol nomenclature used herein and in the drawing.

TABLE 1

| SYMBOL NOMENCLATURE | | |
|---|---|---|
| A | = | Scalar Amplitude Offset Factor |
| $a_{nm}(\Delta)$ | = | Sampled Reference Signal (Complex) |
| c | = | Clutter Scattering Function |

TABLE 1-continued

SYMBOL NOMENCLATURE

| | | |
|---|---|---|
| c | = | Propagation Velocity (m/sec) |
| E{} | = | Expected Value |
| $f_n$ | = | $n^{th}$ Doppler Frequency (Hz) |
| $f_D$ | = | Doppler Frequency Bin Width (Hz) |
| $G(\theta,\phi)$ | = | One-way Antenna Power Gain |
| i | = | Scatterer Index $(1,N_S)$ |
| j | = | Scatterer Index $(1,N_S)$ |
| L | = | Number of Subdwell Periods Per Coherent Processing Interval |
| m | = | Sample Window Index |
| m(t) | = | Random Modulation Function (Complex Reference Signal Envelope) |
| M | = | Number of Chips Per Pulse Dwell Period |
| n | = | Doppler Frequency Index |
| N | = | Number of Pulse Per Subdwell Period |
| $N_S$ | = | Number of Discrete Scatterers |
| p(t) | = | Pulse Gate Function (0,1) |
| $P_C$ | = | Received Power Before Clutter Cancellation (Watts) |
| $\Delta P_C$ | = | Residual Clutter Power Received (Watts) |
| $r_{nm}(\Delta)$ | = | Demodulated/Sampled Reference Signal (Complex) |
| $R(\tau)$ | = | Range As A Function of Time Delay |
| $s(\tau)$ | = | Complex Scattering Function |
| $s_n(t)$ | = | Random Transmit Signal |
| $s(\tau_{ci})$ | = | Estimated Scattering Function ($i^{th}$ Scatterer) |
| $T_S$ | = | Sample Window (Seconds) |
| T | = | Pulse Repetition Time (PRT) (Seconds) |
| t | = | Time (Seconds) |
| $v_c$ | = | Clutter Velocity (Doppler) |
| $w_n$ | = | nth Weighting Factor |
| x(t) | = | Received Signal (Volts) |
| $x_n(t)$ | = | Sampled Received Signal (Volts) |
| $x_{nm}$ | = | Demodulated/Sampled Received Signal (Volts) |
| $y_n(\Delta)$ | = | Correlation Output Signal (Volts) |
| $\hat{z}(\Delta,F_n)$ | = | Doppler Filter Bank Response Function |
| $\hat{z}(\Delta_t,f_t)$ | = | Uncorrelated Clutter Estimate in Target Cell $(\Delta_T,f_T)$ |
| $\gamma$ | = | Transmission Phase Delay (Radians) |
| $\delta$ | = | Demodulator Phase Delay (Radians) |
| $\Delta$ | = | Range Time Delay (Seconds) |
| $\lambda$ | = | Wavelength (Meters) |
| $\theta$ | = | Spherical Coordinate Basis (Radians) |
| $\theta_a$ | = | Antenna Pointing Azimuth Angle (Radians) |
| $\phi$ | = | Spherical Coordinate Basis (Radians) |
| $\sigma_{SL}$ | = | Standard Deviation of Random Signal Function Sidelobes |
| $\sigma_c$ | = | Clutter Backscatter Coefficient |
| $X(\tau,f_d)$ | = | Complex Matched Filter Response Function |
| $X_t(\Delta,f)$ | = | Stored Reference Signal Response Function |
| $X_R(0,0)$ | = | Reference Signal Autocorrelation Function |
| $\tau$ | = | Correlation Time Delay (Seconds) |
| $\omega_c$ | = | Carrier Frequency (Radians/Second) |

The Clutter-Induced Noise Problem

It is an object of this invention to cancel the uncorrelated clutter noise arising from the clutter modulation of a randomly-modulated radar signal by a stationary scatterer. It is another object of this invention to provide a method and apparatus for adaptively minimizing such clutter modulation noise in an adaptive pulsed Doppler radar system. It is yet another purpose of this invention to obtain large improvements in signal-to-noise ratio (SNR) through such clutter modulation noise cancellation.

A basic pseudorandom noise (PRN) type of random signal waveform is illustrated in FIG. 1. This waveform is suitable for use with this invention. Within a single coherent processing interval (CPI) 13, the random signal includes a plurality (L in number) of subdwell intervals typified by subdwell interval 14 embracing subdwell-1. A plurality of pulses (N in number), typified by pulse 15, are dispersed over subdwell interval 14. A plurality of chips (M in number), typified by chip 16, are distributed throughout each pulse repetition interval (PRI). The M chips are shown in FIG. 1 as collected together into a single pulse 15. However, the chips are uncorrelated (pseudorandom) and may be dispersed over each of the pulse repetition intervals (PRIs) typified by PRI 18.

The illustrated waveform contains N pulses 15 distributed within each subdwell interval 14 according to the length of PRI 18. PRI 18 may be fixed in length throughout the subdwell interval 14 or may vary according to any suitable stagger scheme known in the art. Each pulse 15 consists of M chips 16, where the chip width is approximately equal to the reciprocal of the signal bandwidth and where M is equal to the pulse compression ratio (PCR).

The peak pulse power of pulse 15 is limited to a constant value over CPI 13. Selection of pulse repetition interval 18 is governed by a trade-off between processor speed and acceptable Doppler ambiguity. The processing gain for PRN signal waveform radar systems is generally known to be equal substantially to the number of chips per pulse multiplied by the number of pulses per subdwell interval multiplied by the number of subdwell intervals per coherent processing interval, written as L*M*N. Accordingly, increased processing gain is obtained by increasing the length of CPI 13 and by increasing the number M of chips through a decrease in the chip width resulting from an increase in signal bandwidth.

An increase in either bandwidth or CPI duration causes an increase in signal time-bandwidth product and a corresponding increase in target resolution. For target maneuvers at 2 g's, CPI 13 is limited practically to less than 15 milliseconds (to avoid range smearing). Moreover, within such an interval, range motion compensation is necessary for time-bandwidth products in excess of, say, 125,000, because of the relationship between signal propagation velocity and relative target velocity. That is, with a 15 millisecond coherent processing interval, 2 g target motion compensation is generally required for bandwidths greater than 8 MHz. Because the apparatus of this invention is intended for operation at bandwidths above 500 MHz, the methods of this invention require some suitable motion compensation technique.

Figure 2:
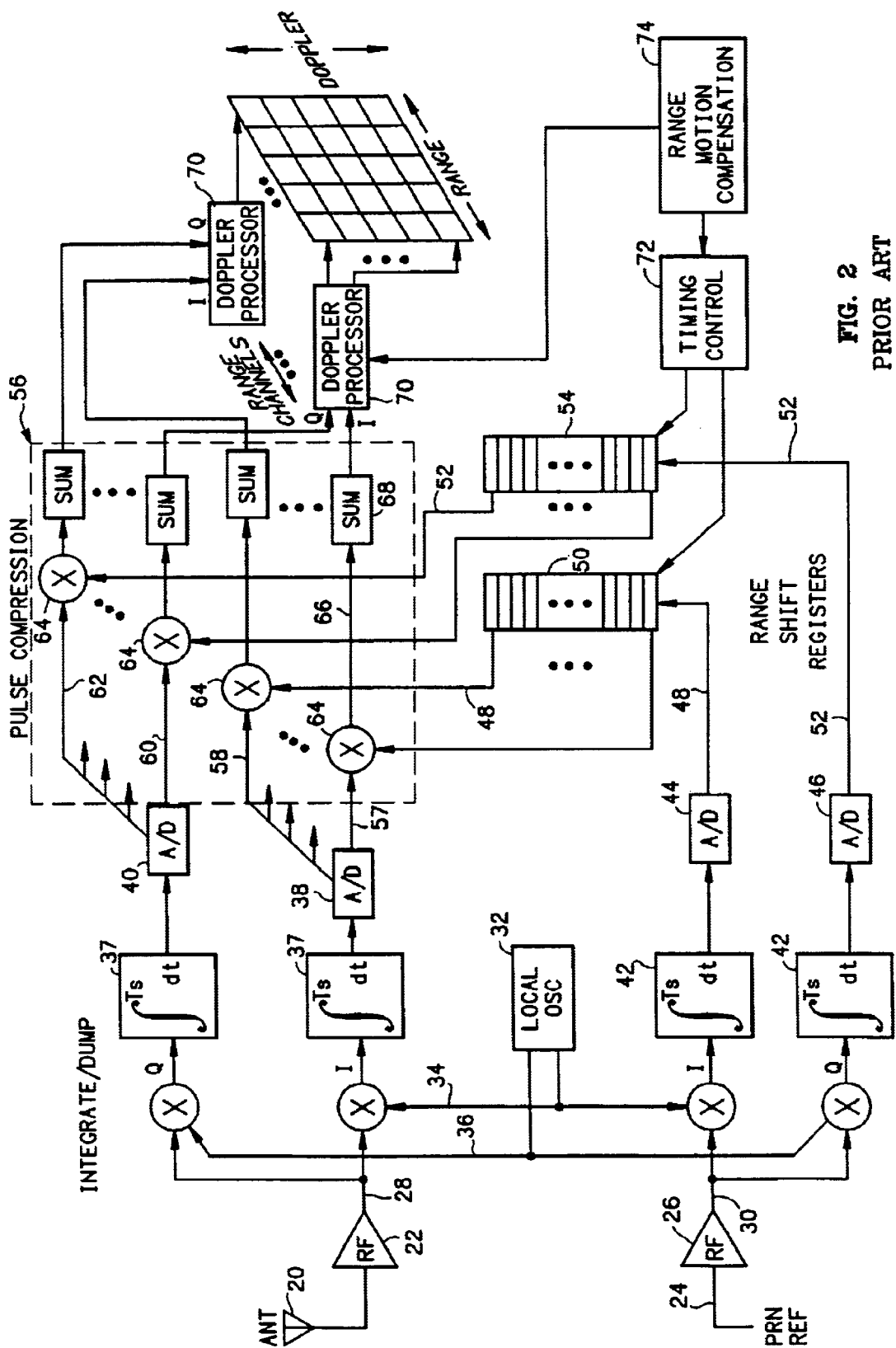
FIG. 2 shows an illustrative random signal radar receiver from the prior art.

FIG. 2 presents an illustrative embodiment of a PRN signal receiver used in conventional pulsed Doppler radar signal receiver. The operation and function of such a receiver can be readily understood with reference to, for example, D. K. Barton, et al., "Radar Evaluation Handbook", Artech House, Norwood, Mass. 1991.

A signal is received at antenna 20 and amplified in an RF amplifier 22 for distribution to the integration and dumping circuit described below. The PRN reference signal 24 is amplified in an RF amplifier 26 and similarly presented to another such integration and dumping circuit. The amplified RF signal 28 and the amplified reference signal 30 are each presented to a pair of multipliers labelled I and Q in the manner shown. Two signals 34 and 36 from the local oscillator 32 are also presented to the two multiplier pairs in the manner shown.

The product of signal 28 and local oscillator output 34 is proportional to the in-phase (I) component of signal 28. The product of signal 28 and the quadrature (90 degrees delayed) local oscillator signal 36 is proportional to the quadrature (Q) component of signal 28. Similarly, the in-phase (I) and quadrature (Q) components of signal 30 are separated by the other multiplier pairs as shown.

The I and Q components of receiver signal 28 are each presented to an integrator 37, wherein they are integrated over the sample period $T_S$ before being dumped to a pair of analog-to-digital (A/D) converters 38 and 40. Similarly, the I and Q components of reference signal 30 are presented to integrators 42 where they are similarly integrated and dumped to the A/D converters 44 and 46, respectively.

The digital output signal 48 from A/D converter 44 is presented to a first shift register 50 and the output signal 52 from A/D converter 46 is presented to a second shift register 54. Shift registers 50 and 54 merely introduce time delay increments to the digital in-phase and quadrature reference signals 48 and 52, respectively.

The schematic representation of A/D converters 38 and 40 shows a similar delay scheme for generation of a series of I and Q received signal components delayed in time in a manner that simulates a series of range cell delays. For simplicity, the pulse compression network/56 is illustrated as an array of multipliers 64 and summers 68 organized according to range cell time delay. Thus, the output signals from A/D 38 include the undelayed digital in-phase component 57 and a plurality of delayed components, each delayed behind the previous one by a single range cell increment, ending with the final maximally delayed in-phase component 58.

Similarly, the quadrature component of the received signal is digitized and spread from the undelayed Q component 60 through a number of incrementally delayed components, ending with the maximally delayed quadrature component 62.

As can be appreciated from FIG. 2, the plurality of multipliers 64 serves to generate a series of products of the in-phase and quadrature components of the received and reference signals, representing the elements of a cross-correlation function. Thus, the undelayed reference signal in-phase component 48 is multiplied by the undelayed in-phase received signal component 57 to form the signal product 66 for the first or closest range cell. Signal 66 is presented to a summer 68, whose output represents the in-phase correlated received signal component accumulated over the pulse repetition interval.

Similar multiplication and summing procedures are effected for the undelayed quadrature component 60 of the received signal and for the I and Q components of each received signal component for each of the several range cells illustrated. The resulting array of I and Q (complex) received signals are presented to an array of Doppler processors 70. Each Doppler processor 70 performs a Fast Fourier Transform (FFT) operation on an incoming complex digital signal representing the correlated echo in a single range cell, thereby spreading the range cell over a second interval of Doppler frequency shift cells. This frequency shift or target velocity spreading operation is performed for each of the several time-delayed receiver signals (target range cells) presented by pulse compression network 56. The final result is a two-dimensional array of complex signals representing the target echo power in each of a number of incremental target range and target velocity cells.

Range shift registers 50 and 54 process the complex PRN reference signal 30 to make it compatible with the complex received signal 28 at A/D converters 38 and 40. The effect of multipliers 64 is to correlate the incoming receiver signal with the PRN reference signal to retrieve the information that was initially spread over the spectrum as pseudorandom noise. This operation is coordinated through the use of the timing control circuit 72 and a range motion compensation circuit 74. Circuit 74 is necessary because of the time-bandwidth product of the illustrative apparatus in FIG. 2 relative to the rate of change of target range expected for the target types of interest (missiles maneuvering at accelerations up to 2 g's). Without range motion compensation 74, the receiver in FIG. 2 would lose performance because of signal smearing over several range cells during each pulse repetition interval.

FIGS. 3A and 3B provide a summary of the mathematical relationships from the pulsed Doppler radar receiver art that are implemented in the receiver of FIG. 2. Eqns. 1–14 can be appreciated with reference to the Barton et al. reference and to the Schmidt et al. and Ward patents cited hereinabove.

Eqns. 1–14 are related to FIG. 2 as follows. Eqn. 1 defines the random reference signal 24 in FIG. 2. Eqns. 2–4 define the complex demodulated and sampled reference signal shown as in-phase signal 48 and quadrature signal 52. Eqn. 5 defines the composite received signal at antenna 20 in FIG. 2. Eqn. 6 defines the $n^{th}$ clutter component of the received signal of. Eqn. 5, represented as a volume integral. Eqns. 7 and 8 define the complex demodulated and sampled received signal represented as in-phase component 57 and quadrature component 60. Eqn. 9 describes the correlation output signal input to each Doppler processor 70 in FIG. 2, and Eqns. 10–14 describe the complex output, signals from Doppler processors 70.

Figure 4A:
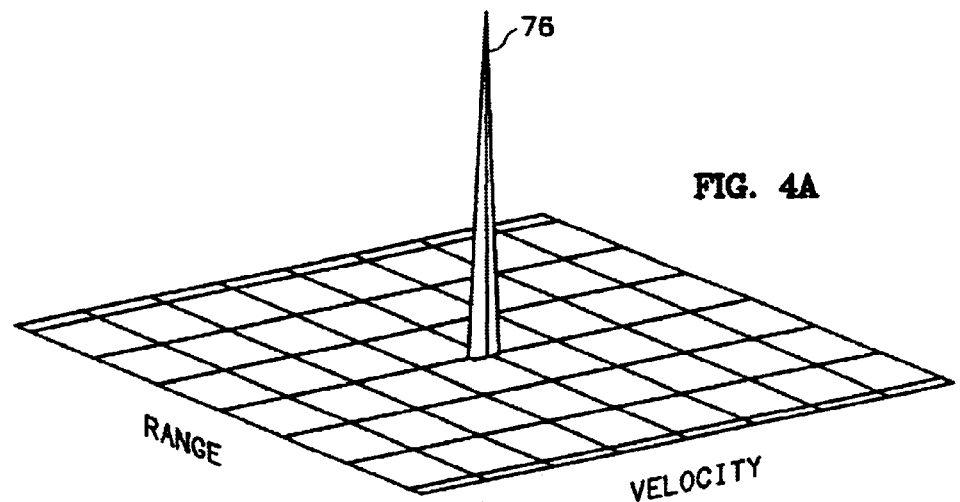
FIGS. 4A–4C illustrate the radar ambiguity function on the range-velocity plane for several signal waveforms.
Figure 4B:
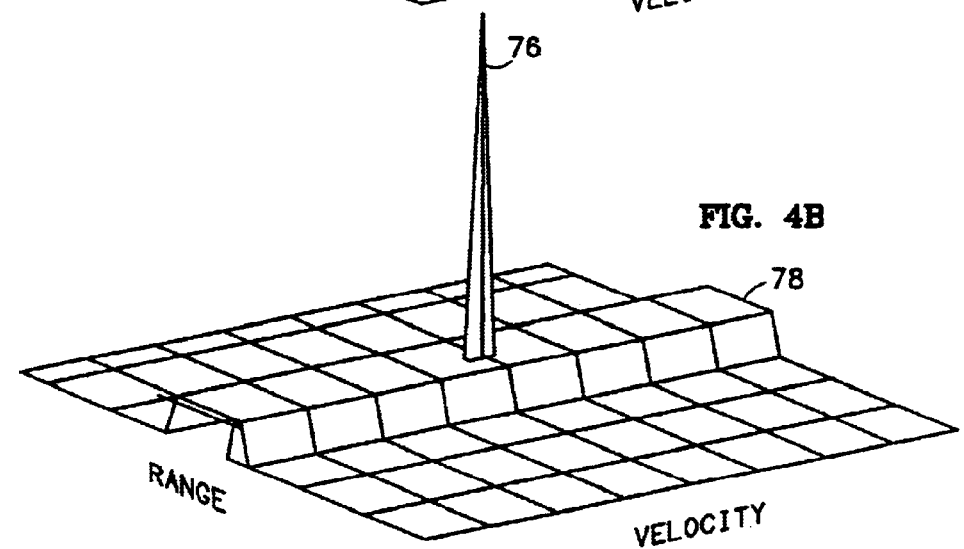
Figure 4C:
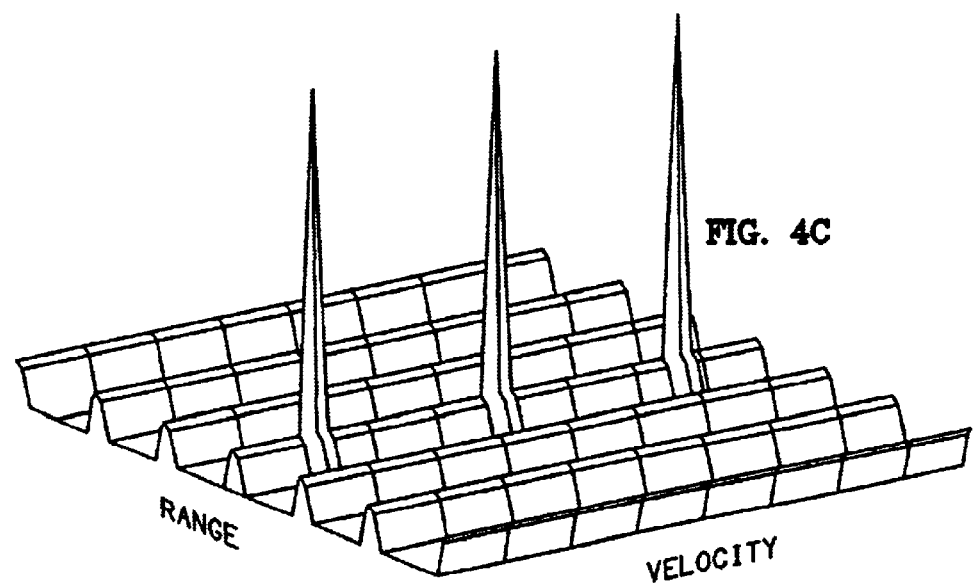

FIGS. 4A–4C provide three illustrative graphical views of the radar ambiguity function over the range-velocity plane for random signal radars. In FIG. 4A, the "thumbtack" ambiguity surface is illustrated. This surface is interpreted as an ideal ambiguity function, where none of the energy at the center range-velocity cell is dispersed over other cells in the range-velocity plane. The thumbtack surface represents the statistical mean of an ideal random signal waveform ambiguity function.

FIG. 4B illustrates the same thumbtack 76 sitting on a new pedestal 78, which may be thought of as a smearing of the energy at thumbtack 76 over a portion of the range-velocity plane. As described above, pedestal 78 represents the variance of the random signal-induced clutter noise that is uncorrelated with the thumbtack 76 target cell.

FIG. 4C illustrates the effects of increasing the Pulse Repetition Frequency (PRF) on the ambiguity function. Increasing the PRF squeezes together the pedestals in the range dimension as shown. Ambiguous thumbtack peaks occur along the main range pedestal spaced at the PRF in the velocity dimension.

Figure 5:
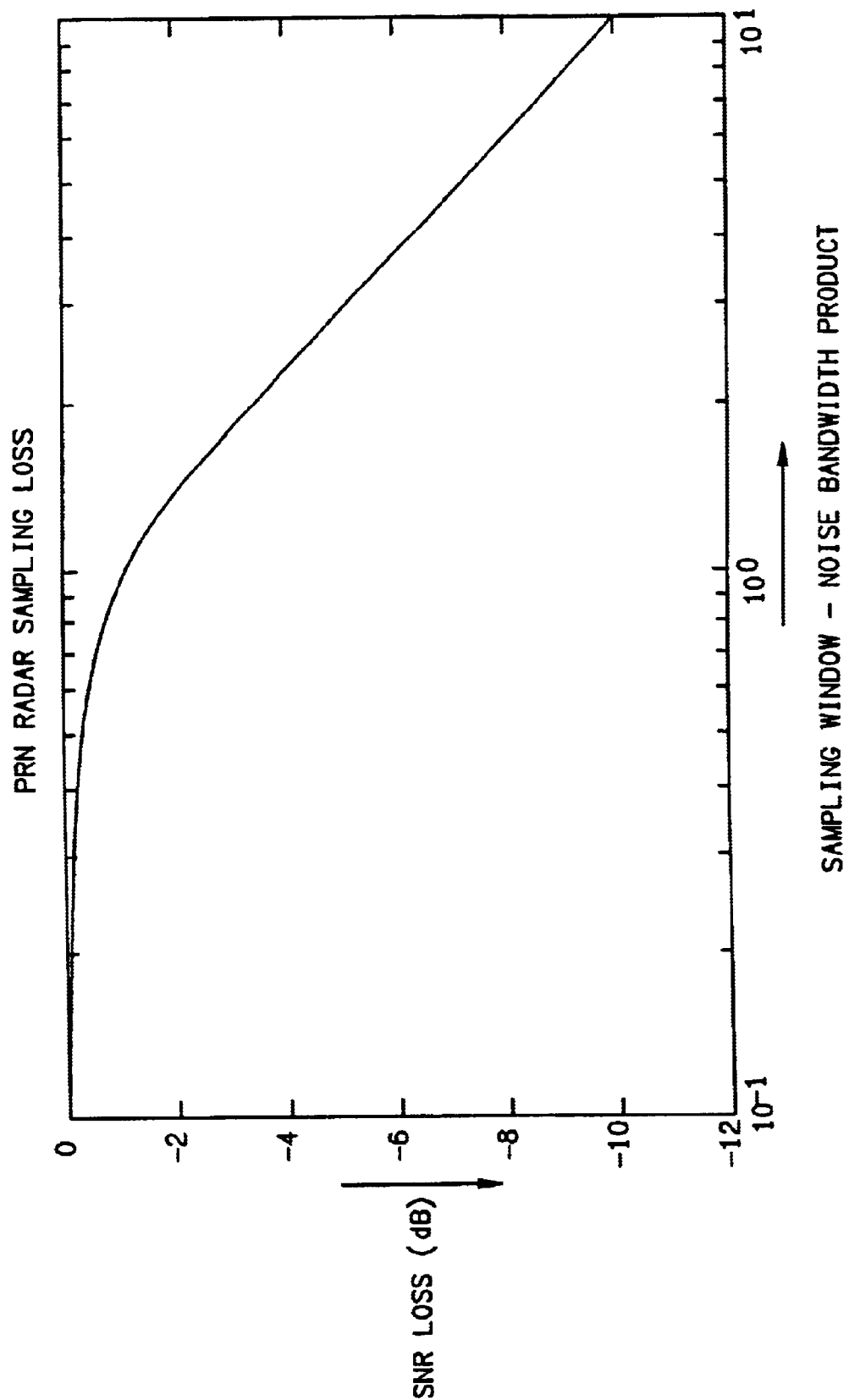
FIG. 5 illustrates the theoretical relationship between pseudo-random noise (PRN), radar sampling loss and the sampling window-noise bandwidth product.

FIG. 5 presents a theoretical analysis of the decrease in Signal-to-Noise Ratio (SNR) as a function of noise bandwidth product for the PRN radar receiver of FIG. 2. This graphical result demonstrates the limitations of performance that require Analog-to-Digital (A/D) sampling rates on the order of the reciprocal of signal bandwidth.

Figure 6:
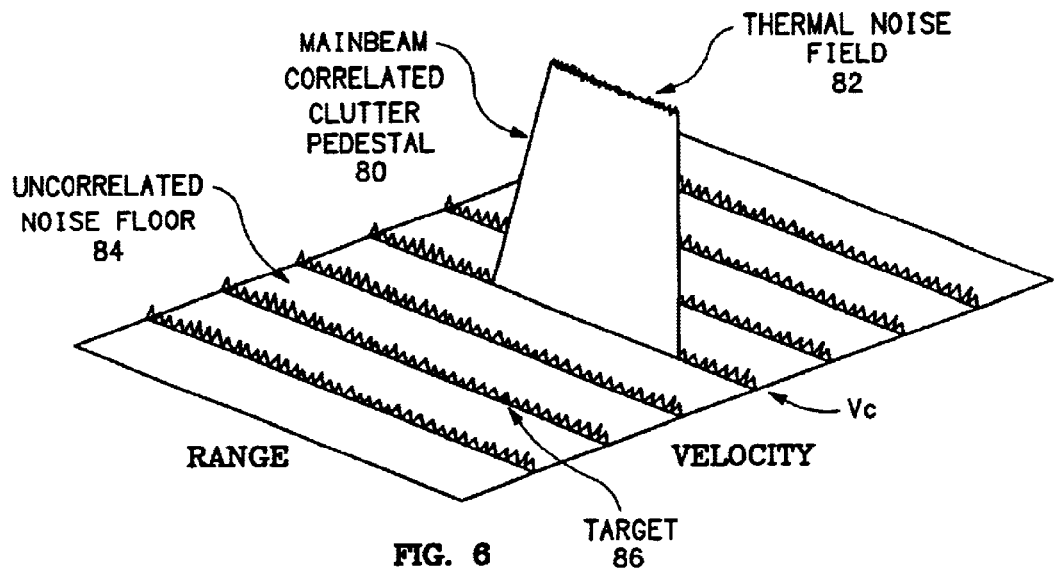
FIG. 6 shows an illustrative random signal radar clutter distribution over the range-velocity plane.

FIG. 6 provides another view of the range-velocity plane. The main beam correlated clutter pedestal 80 is shown spread over a number of range cells at velocity, $v_C$. A thermal noise field 82 is superimposed at the top of pedestal 80. Everything in the range-velocity plane is shown referred to an uncorrelated noise floor 84, including the energy in the range-velocity cell labelled as target 86. The ambiguity surface in FIG. 6 demonstrates the difficulties presented to the radar receiver designer in attempting to distinguish target 86 from uncorrelated noise floor 84 and from other random noise energies over the range-velocity plane.

Figure 7:
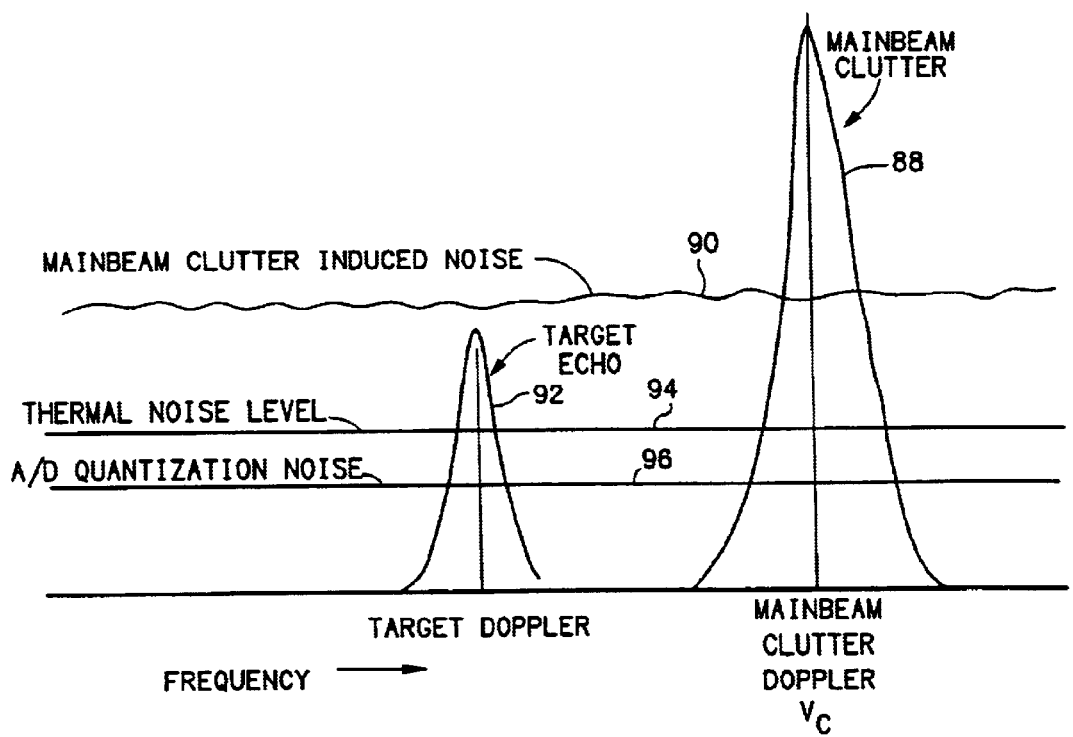
FIG. 7 illustrates random signal radar return spectra for a variety of sinal and noise sources.

FIG. 7 illustrates another view of the random signal radar return spectra. The main beam clutter component 88 is located at $v_C$ and extends well above the main beam clutter-induced noise level 90. The actual target echo component 92 is distinguished from $v_C$ on the Doppler frequency axis but the signal energy at 92 is washed out by noise level 90. The thermal noise level 94 and A/D quantization noise level 96 are included to demonstrate that target signal 92 can be easily detected if main beam clutter-induced noise level 90 is sufficiently reduced.

Interference Canceler Invention

Figures 8, 9:
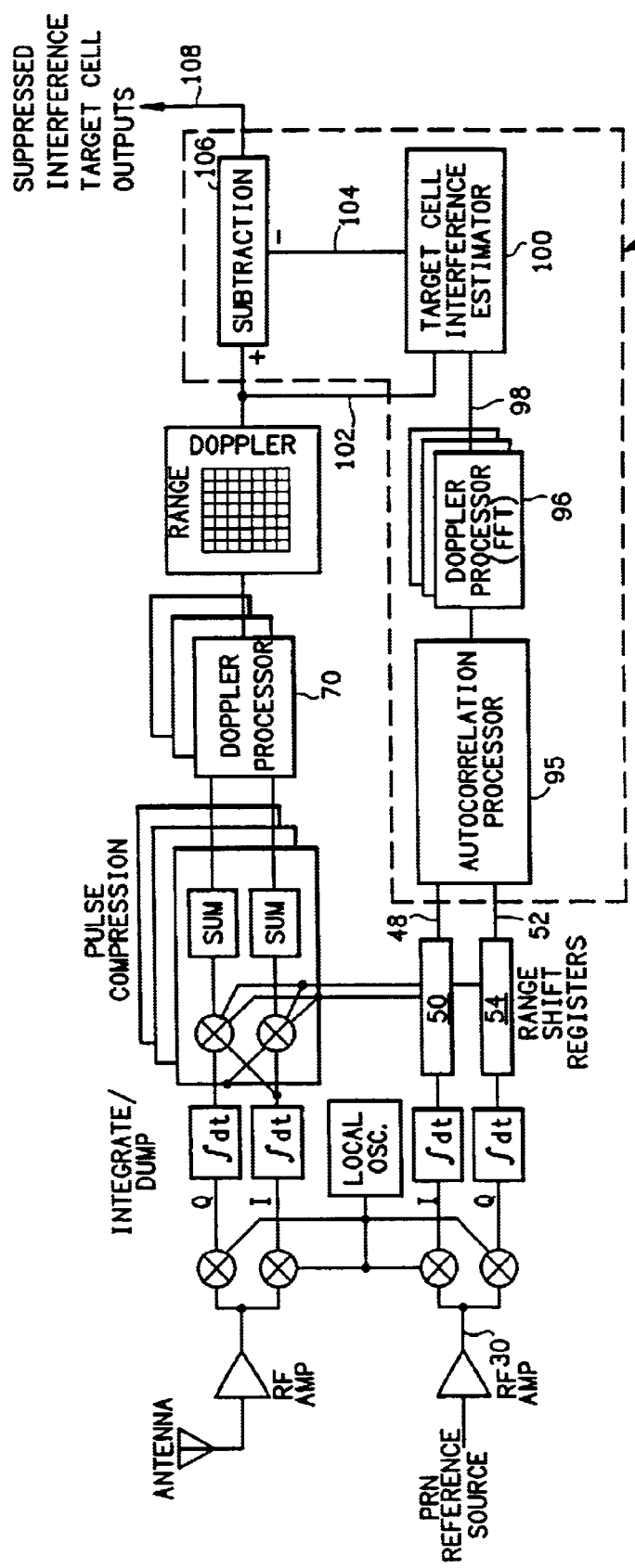
FIG. 8 is an illustrative embodiment of the random signal radar receiver of this invention.
FIG. 9 is a detailed illustrative embodiment of the random signal-induced clutter interference canceler apparatus of this invention from FIG. 8.
Figure 9:
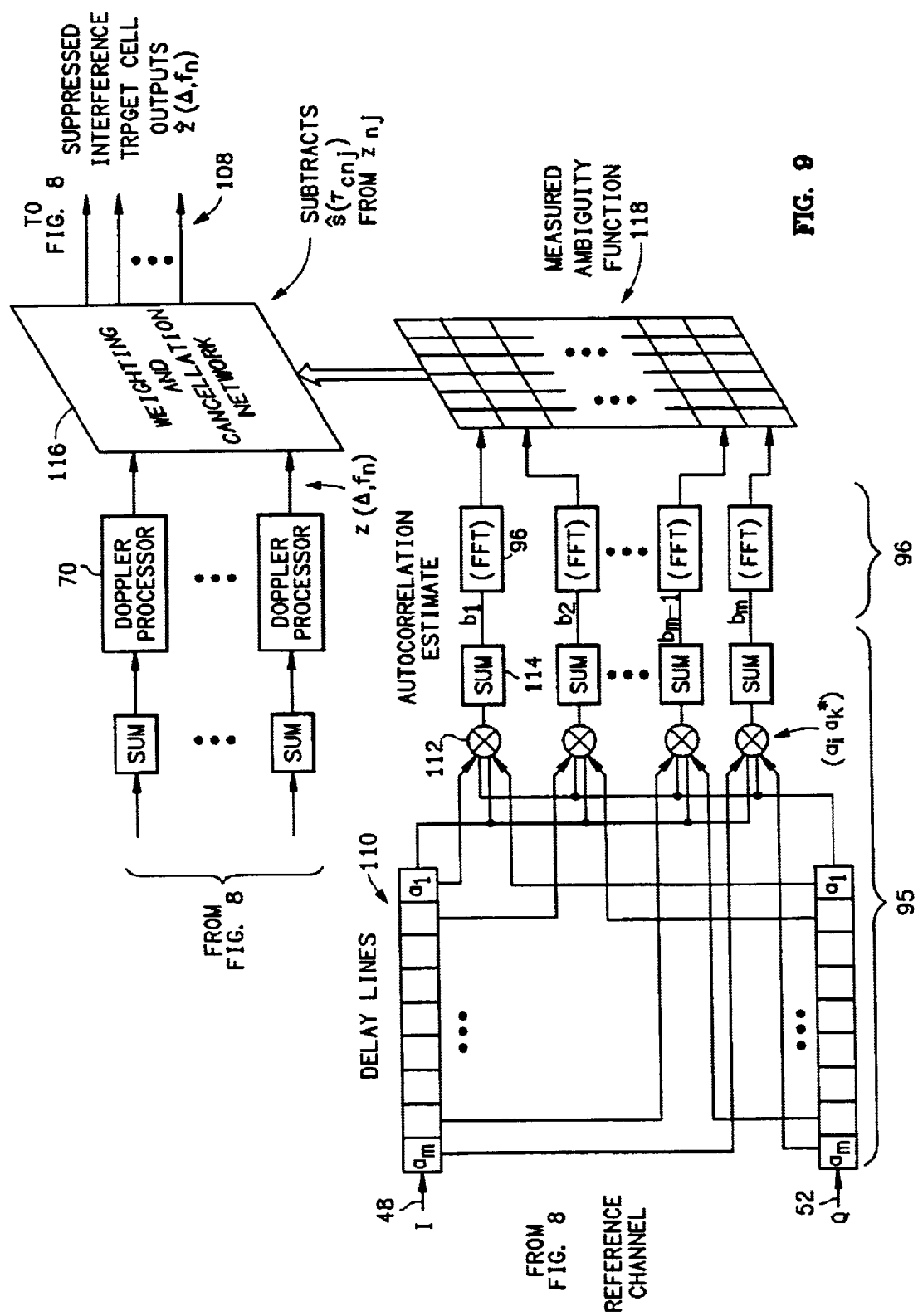

The fundamental clutter-induced noise problem discussed above in connection with FIGS. 1–7 is solved by the method and apparatus of this invention. FIG. 8 shows the PRN radar receiver embodiment of FIG. 2 with an additional clutter interference canceler apparatus representing an illustrative embodiment of this invention. This canceler apparatus includes an autocorrelation processor 95 that receives inputs from each of the two range shift registers 50 and 54. These inputs are the same in-phase and quadrature signal components 48 and 52 shown in FIG. 2. The outputs from autocorrelation processor-95 are distributed to a bank of Doppler processors 96 that are substantially identical in function to Doppler processors 70 in FIG. 2. A plurality of signals representing the autocorrelation function of the PRN reference signal 30 are shown as signals 98 from Doppler processors 96. Signals 98 represent the measured signal ambiguity function and are presented to a target cell interference estimator circuit 100. The plurality of range-velocity cell signals from Doppler processors 70 represents estimates of the radar return signal power in each of the target range and velocity cells, which are shown in FIG. 8 as the cell signals 102. Cell signals 102 are presented to interference estimator 100 to permit the initial estimation of clutter locations in the range-velocity plane by combination with signals 98. This location of the clutter source is achieved by the interference estimator 100 searching for large signal peaks to select at least one uncorrelated clutter source whose contribution is to be canceled.

Target cell interference estimator 100 provides a group of estimate signals 104 to a subtraction array 106. Subtraction array 106 removes the estimated interference from the received signal and produces a group of suppressed interference target cell output signals 108. Each of the signal groups 102, 104 and 108 represent an array of target cells arranged over the range- velocity plane.

FIG. 9 provides an illustrative embodiment of the clutter interference canceler apparatus of FIG. 8. Autocorrelation processor 95 is shown having a plurality of delay lines 110, which present in-phase and quadrature signals 48 and 52 to a plurality of multipliers 112 and therefrom to a plurality of summers 114. Each summer output is labelled as $b_i$ (i=1,m), representing an autocorrelation estimate for a particular range cell. Each such autocorrelation estimate is presented to an FFT network (Doppler processor 96), which produces a plurality of output signals spread over the Doppler velocity region of the range-velocity plane.

The outputs from FFTs 96 represent the measured ambiguity function surface 118. Ambiguity function 118 is presented to a weighting and cancellation network 116, which combines the target cell interference estimator 100 and subtraction array 106 functions discussed above in connection with FIG. 8. Network 116 presents the suppressed interference target cell output signals 108 to the next stage of the radar system, which could be a system detection processor (not shown) for cataloging, identifying and tracking targets in any suitable manner known in the art.

The clutter interference canceler shown in FIG. 9 can be better appreciated with reference to Eqns. 15–18 in FIG. 10 and Eqns. 19–20 in FIG. 11. Eqn. 15 defines the scattering noise model assumed for a plurality of clutterers, $c_i$ (i=1,$N_S$). The clutter scatterers are assumed to be $N_S$ in number. Eqn. 16 represents the Doppler processor response signals 102 (FIG. 8) to the accumulated scattering noise from Eqn. 15. Signals 102 are used to select the locations of suspected scatterers in the range-velocity plane.

Eqn. 17 describes the scattering noise estimate for the $i^{th}$ scatterer expressed as a summation of contributions from all suspected scatterers over the index j. Eqn. 18 describes the uncorrelated clutter estimate signals 104 (FIG. 8) for the target cell ($\Delta_T, F_t$)

FIG. 11 presents an approximate expression for residual clutter power following cancellation of clutter-induced noise by the methods and apparatus of this invention. Eqn. 19 shows that the estimated residual clutter power is inversely proportional to the chips per pulse and pulses per subdwell for the random signal in FIG. 1. Eqn. 20 is estimated pre-cancellation input power expressed in terms of the clutter statistics. Eqn. 21 shows the uncorrelated clutter cancellation SNR improvement to be substantially equivalent to the main beam illumination dwell divided by the coherent processing gain. This result is illustrated graphically in FIG. 12 for a range of 2-way antenna beamwidths.

FIG. 12 shows that the reduction in the level of pedestal 78 (FIG. 4B) ranges from 10 dB at 30° beamwidth to over 30 dB at 2° beamwidth. The improvement is limited by the Doppler processing gain limit for the carrier frequency ($f_C$=35 GHz) and Doppler cell width ($f_D$=70 Hz) used in the model.

Figure 13:
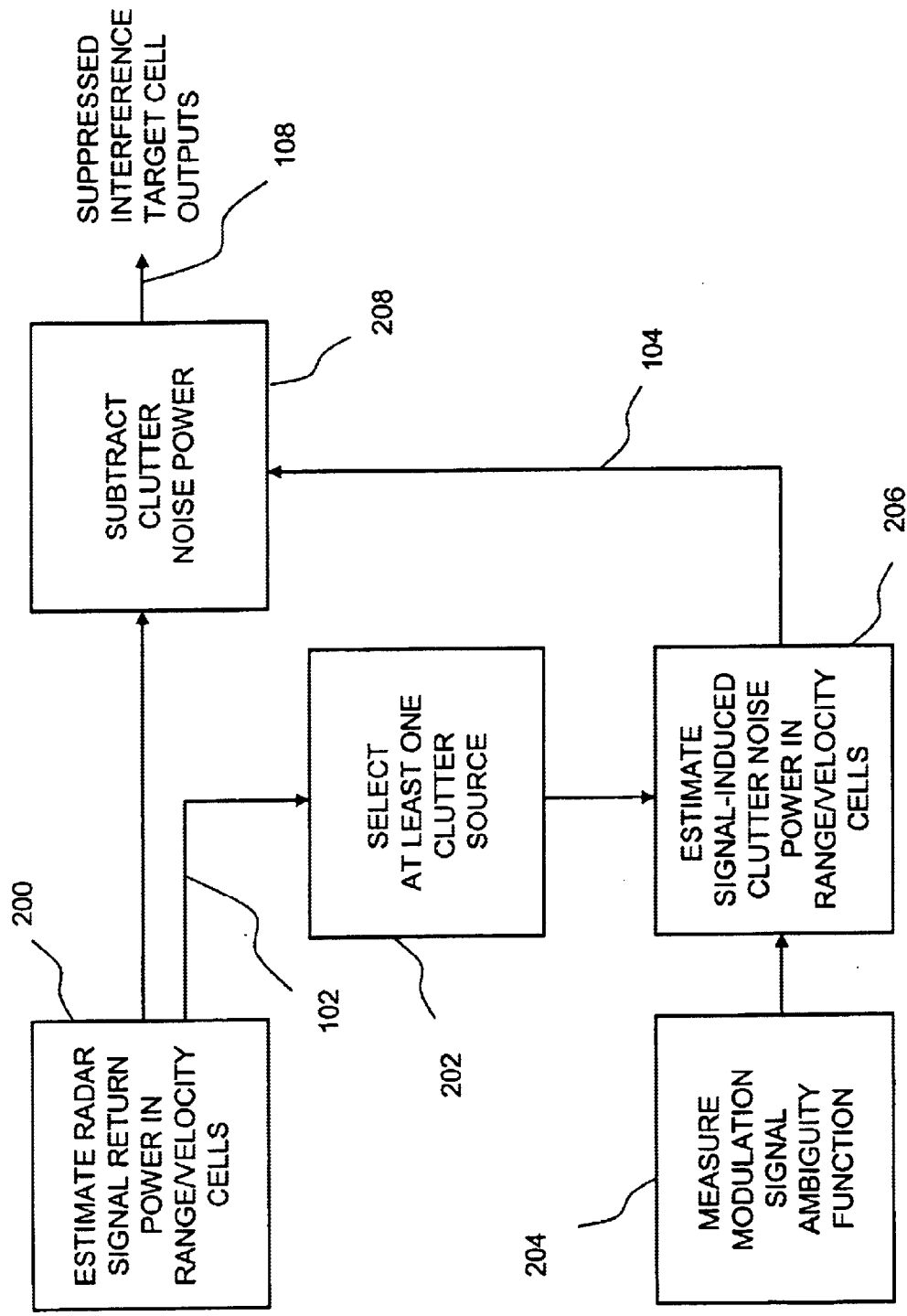
FIG. 13 illustrates the method of the present invention.

FIG. 13 illustrates one embodiment of the method of the invention. An estimate of the radar return signal power in each of a plurality of range and velocity cells is generated in step 200. At least one uncorrelated clutter source is selected at step 202 by identifying a peak value of the radar return signal power. In step 204, the radar modulation signal ambiguity function magnitude for the radar system is measured for each of a corresponding plurality of range and velocity cells. Since the relative location of the selected clutter source (step 202) with respect to any given range and velocity cell is know, an estimate of the signal-induced clutter modulation noise power in each of the plurality of cells can be made by combining the peak radar return signal power with the modulation signal ambiguity function magnitude in step 206. The estimated noise power (from step 206) is then subtracted in step 208 from the estimate of radar return signal power (from step 200) thereby providing cancellation It is a feature of this invention that the measured modulation power spectral density is used to estimate interference levels arising from stationary scatterers. Conventional radar waveforms are deterministic with a known frequency response. Randomly-modulated signal waveforms are not deterministic and their frequency response must be continuously measured on a dwell-to-dwell basis to effect cancellation of signal-induced interference.

It is an advantage of this invention that improving the SNR does not require higher radiated power or more expensive components but can be accomplished merely by additional processing procedures. It is a further advantage of this invention that it can be applied to a variety of applications requiring highly refined target range resolution and to both surface and airborne radar systems.

Further, in this invention, inverse filtering can be used to widen the effective bandwidth or range resolution with which stationary scatterers are identified for cancellation. This approach is applicable to large reflectors such as signal repeaters or other airborne and stationary point scatterers.

Obviously, other embodiments and modifications of this invention will occur readily to those of ordinary skill in the art in view of these teachings. Therefore, this invention is to be limited only by the following claims, which include all such obvious embodiments and modifications when viewed in conjunction with the above specification and accompanying drawing.

What is claimed is:

1. A method for processing a radar return signal in a radar system in which a radar modulation signal is employed to estimate the range and velocity of a target, said method comprising the steps of:

correlating said radar modulation signal with said radar return signal to obtain a demodulated return signal;

obtaining a first Fourier Transform of said demodulated return signal for each of a plurality of time intervals corresponding to a plurality of target range cells, each said first Fourier Transform corresponding to a Doppler shift spectrum representing the estimated radar return signal power distribution over a plurality of target velocity cells at one of said plurality of target range cells;

correlating said radar modulation signal with itself to obtain a transmit modulation autocorrelation signal;

obtaining a second Fourier Transform of said transmit modulation signal for each of said plurality of time intervals, each said second Fourier Transform corresponding to a Doppler shift spectrum representing the uncorrelated range cells;

estimating the clutter modulation noise power in each said target range and velocity cell for said at least one clutter source by combining each said second Fourier Transform with at least one peak value of said estimated radar return signal power distribution; and subtracting said clutter modulation noise power estimate from the corresponding said radar return signal power estimate to obtain an enhanced radar signal power estimate for said each target range and velocity cell.

2. A method for canceling the effects of signal-induced clutter modulation noise in a radar system, said method comprising the steps of:

(a) estimating the radar return signal power in each of a plurality of range and velocity cells;

(b) selecting at least one uncorrelated clutter source by identifying at least one peak value of said radar return signal power in at least one of said plurality of cells;

(c) measuring the radar modulation signal ambiguity function magnitude for said radar system for each of a corresponding plurality of range and velocity cells;

(d) estimating the signal-induced clutter modulation noise power in each of said plurality of cells by combining said at least one peak radar return signal power with said radar modulation signal ambiguity function magnitude; and (e) subtracting said signal-induced clutter modulation noise power estimates from said radar return signal power estimates in each of said plurality of cells.

3. In a pulsed Doppler radar system of the type having a modulation signal and means for estimating the target signal power in each of an array of target range and velocity cells organized according to target signal time delay and Doppler frequency shift, an uncorrelated clutter modulation noise canceler comprising:

autocorrelation means for obtaining the autocorrelation function of said modulation signal;

Doppler processor means for computing the modulation weight of said autocorrelation function for each cell of said array of target cells, said modulation weight corresponding to the mean square amplitude of said autocorrelation function;

clutter selection means for identifying a clutter noise source in at least one said target cell; and interference estimator means for combining said modulation weight and the estimated power of said clutter noise source to obtain a weighted clutter noise power in each of said target cells.

4. The noise canceler of claim 3 further comprising:

subtractor means for subtracting said weighted clutter noise power from said target signal power for each of said target cells, whereby said clutter modulation noise is canceled.

* * * * *